Feb. 1, 1938. C. B. JOHNSON 2,107,247
VISOR CONSTRUCTION
Filed June 20, 1935 2 Sheets-Sheet 1
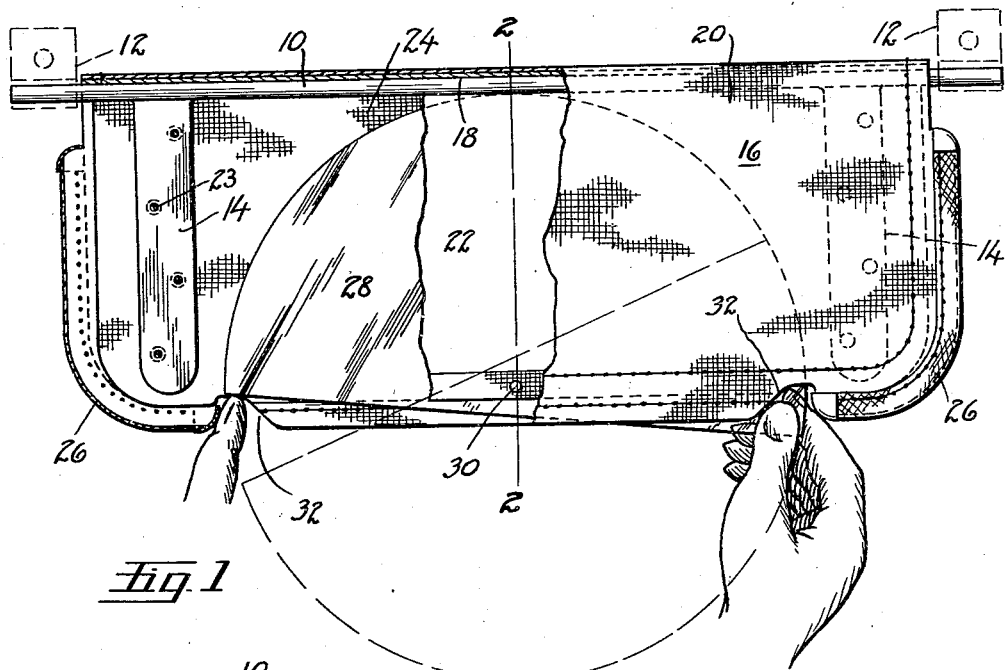
Fig. 1
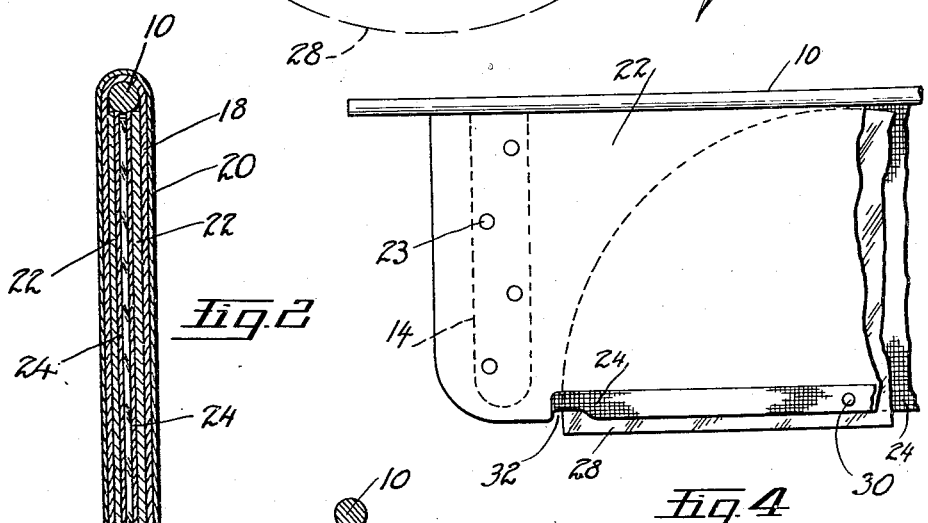
Fig. 2    Fig. 4
Fig. 3
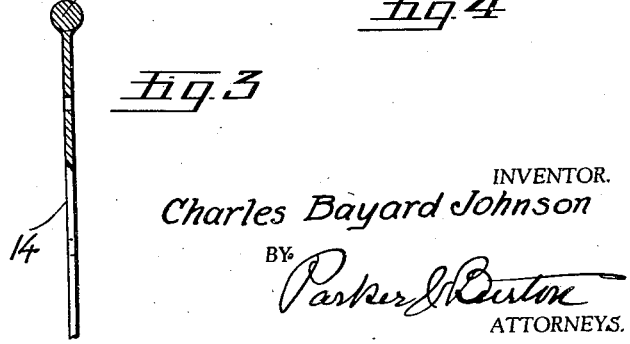
INVENTOR.
Charles Bayard Johnson
BY
ATTORNEYS.

Feb. 1, 1938.  C. B. JOHNSON  2,107,247
VISOR CONSTRUCTION
Filed June 20, 1935    2 Sheets-Sheet 2
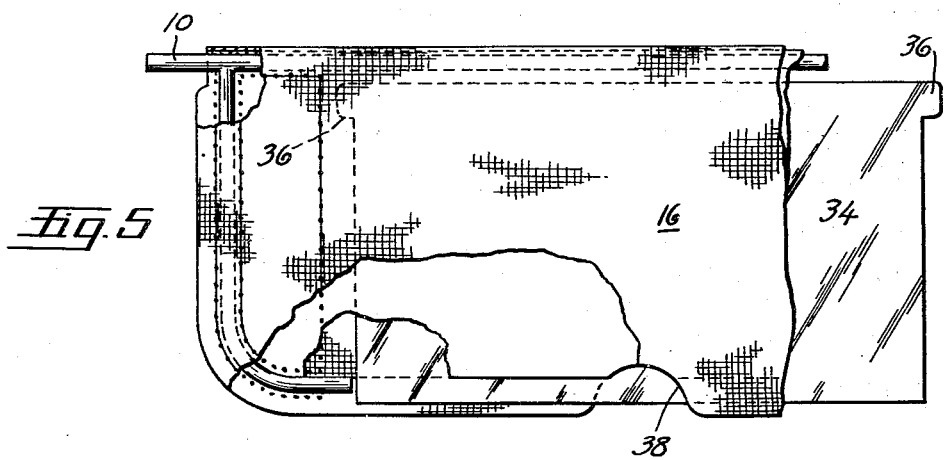
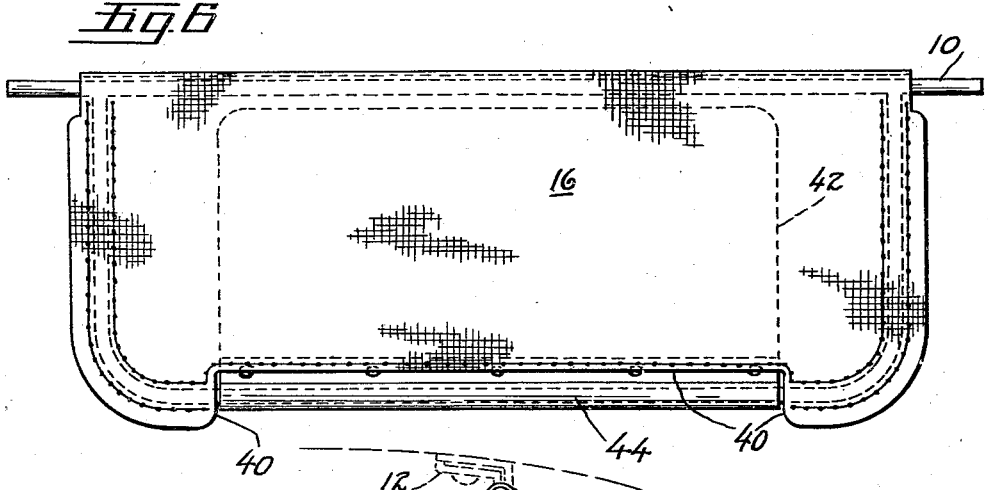
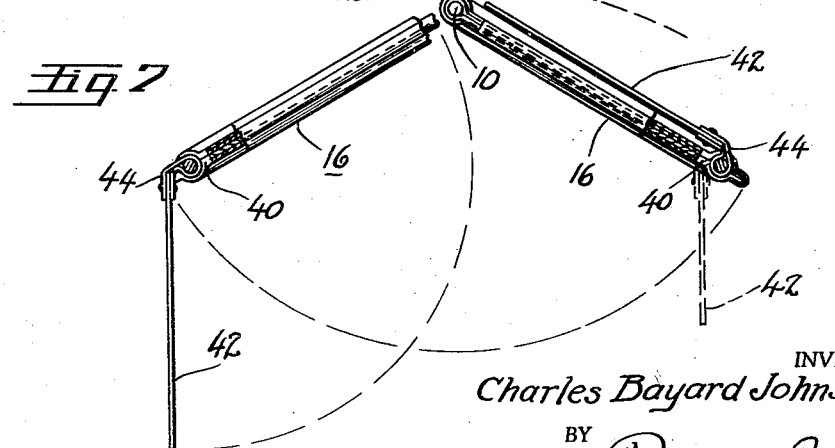
INVENTOR.
Charles Bayard Johnson
BY
ATTORNEYS.

Patented Feb. 1, 1938

2,107,247

UNITED STATES PATENT OFFICE 2,107,247

VISOR CONSTRUCTION

Charles Bayard Johnson, Monroe, Mich., assignor to Woodall Industries Incorporated, Detroit, Mich., a corporation of Michigan Application June 20, 1935, Serial No. 27,474

12 Claims. (Cl. 296—97)

My invention relates to improvements in sun visors as adapted particularly for the interior of a motor vehicle.

An object is to provide a visor comprising an opaque panel mounted for adjustment to suitably shield the eyes of an occupant of the vehicle equipped with the visor and which visor includes a supplemental panel element that is normally supported to overlie the visor proper but which may be disposed to serve as an extension thereof and constitute in itself a shield for the eyes of the driver.

This supplemental visor portion is preferably formed of translucent material and has a concealed position of nonuse preferably within the interior of the opaque panel itself but is capable of being withdrawn to a position of use where it serves as an extension of the visor proper.

Various types of translucent visor elements have heretofore been proposed for use but it is only under certain conditions that such visor elements are to be desired and the visor which is in common use is an opaque panel which is generally finished to conform with the interior trim upholstery of the body and which is generally mounted for adjustment so as to be positioned to properly shield the eyes of the driver of the vehicle.

An object of my invention is to provide a visor which comprises the combination of an opaque visor panel element with a translucent visor element which is translucent and swingable to a position of nonuse overlying the opaque panel element or to a position of use, disposed as an extension of the opaque panel element, where it shields the eyes of the driver while permitting visibility therethrough. The construction is simple, rugged, and inexpensive. It possesses various advantages and meritorious characteristics which are more fully apparent from the following specification, appended claims, and accompanying drawings, wherein:

Figure 1 is an elevation of a panel embodying my invention partly broken away to show its interior construction, Fig. 2 is a cross sectional view taken on 2—2 of Fig. 1, Fig. 3 is a cross section through the visor frame, Fig. 4 is an elevation of a fragment of my visor with the translucent element in position of nonuse, Fig. 5 is an elevation of a fragment of a modified form of my visor construction, Fig. 6 is an elevation of a second modified form of my visor structure with the translucent element in position of nonuse, and Fig. 7 is an end elevation partly broken away of the visor structure shown in Fig. 6 with the translucent element in position of use.

In the embodiment of my invention illustrated in Figs. 1 and 2 there is a frame which includes a top frame member 10 and end frame members 14 secured by welding or the like to the top frame member. The end frame members serve to stiffen the panel carried by the frame and to maintain it as a rigid structure capable of being adjusted by being gripped by the hand of the operator so that the panel may be swung from one position to another. Suitable brackets 12 support the visor. These brackets may engage extensions of the top frame member 10 as shown in Fig. 1.

There is mounted on this frame a panel structure indicated generally in Fig. 1 as 16. This panel is shown in Fig. 2 as formed of a sheet of material 18 folded upon itself over the frame member 10 provided with suitable cloth upholstery covering material 20 or the like. This sheet material may be cardboard or other suitable material. A material which has been found suitable is a composition fiber board rendered water resistant by the presence of asphalt and capable of being shaped through a stamping operation which is available on the market under the name of K B board.

The structure of Fig. 2 is shown as further reinforced by two plies of stiff sheet material 22. This material 22 may likewise be cardboard. These sheets 22 are secured to the end pieces 14 by rivets 23 or the like. Secured to the inner face of one or both of these sheets 22 is a layer of felt or fabric 24. The several plies of material may be secured together by being stitched and bound over the ends as at 26 which shows a binder secured over the margin and stitched down and provided with metal clasps at the end.

I provide a translucent visor element 28 which is here shown as semi-circular in shape and which is mounted upon a pivot 30. The pivot shown is in the form of a rivet or the like which extends through the two layers 22 of the panel so as to form a support for the semi-circular visor element 28 which may be rotated to a position of concealment within the interior of the panel as shown in Figs. 1 and 4 or to a position of use depending below the panel and forming an extension thereof as shown in dotted outline in Fig. 1. The lower edge of the panel is notched as at 32 to permit this visor element to be gripped between the thumb and finger of the operator for withdrawal. This visor element constitutes a supplemental visor structure and as shown in the first four figures of the drawings it is swingable rotatably about the pivot 30 to its position of use or nonuse.

The fabric or felt covering 24 which lines the material 22 frictionally engages the two sides of the translucent visor element to hold the same in place within the interior of the panel or to wipe the visor element as it is slidably actuated so as to maintain good visibility.

In addition to the construction shown in the first four figures of the drawings there is shown in Fig. 5 a modified form of construction wherein the translucent visor element is indicated as 34. It is in the form of a sheet or plate having end tabs 36 at its upper corners and it is slidable into and out of the visor panel by direct movement of withdrawal or insertion. The visor panel is provided with a centrally disposed notch 38 which exposes a portion of the visor element 32 to be gripped for withdrawal and when it is withdrawn outwardly to form an extension of the visor the end tabs 36 will engage with the end portions of the visor frame to prevent complete removal of the element so that it will remain a working part of the visor.

This construction differs from that shown in the first four figures in that the frame is shown as having end portions in the form of a wire integral with the top frame portion. These end portions are turned over for a slight distance at their extremities to form a stop or abutment for engagement with tabs 36. Otherwise the visor structure may be built up of the several layers as hereinabove described in connection with the structure illustrated in the first four figures of the drawings.

In Figs. 6 and 7 a second modified form of construction is shown and one wherein the supplemental visor element is not only adapted to be disposed in a position of nonuse overlying the visor panel itself and withdrawn outwardly to form an extension thereof but is also adapted to be disposed at a plurality of angular positions with respect to the opaque visor. In other words, the supplemental visor element may be disposed in a series of planes arranged angularly with respect to the plane of the main visor element.

In this construction the frame structure is similar to that shown in Fig. 5 except that the main visor element is provided at its outer edge with a notch or cut out 40 and the frame extends continuously across such cut out at the front of the visor to serve as a pivotal support for the supplemental translucent visor element here indicated as 42. This visor element 42 is provided along one edge with a hinge portion 44 which may be riveted or otherwise secured thereto which hinge portion embraces the frame and bridges the cut out 40.

Due to this method of supporting the supplemental visor element it is adapted to be swung as on a pivot about the frame to a position where it will overlie the top of the visor as shown in dotted line in Fig. 6 or to a position of use as shown in solid line in Fig. 7 at the right of said figure. At the left hand portion of said figure it is shown in solid line as disposed in Fig. 6 while it is shown in dotted line as projecting outwardly to serve as an extension of the visor panel proper and is disposed in a plane arranged angularly with respect to the plane of the visor proper. The frictional engagement between the pivotal supports for this visor element 42 and the hinge part thereof which engages the pivotal support is such that this visor element will normally maintain any position to which it may be angularly adjusted or it will normally retain its position of nonuse when turned back over the top of the visor panel.

What I claim is:

1. A visor structure comprising an opaque panel formed of two plies of material supported upon a frame disposed between said plies and including a top frame portion and end frame portions, a translucent visor element pivotally supported to be rotatably swung to a position of use projecting outwardly as an extension of said opaque panel or to a position of nonuse disposed between the two plies of said panel.

2. In a visor structure an opaque panel comprising a U-shaped frame, two plies of material supported upon opposite sides of said frame in close but spaced parallel relationship, a translucent visor element supported between said two plies of material within the U-shaped frame and operable to be disposed between said two plies of material or to be withdrawn outwardly therefrom through the open side of the U-frame to form an extension of the panel.

3. A visor comprising a panel formed of two plies of material, a visor element slidably disposed between said two plies to be retracted within the panel between said plies or to be drawn out of the panel to serve as an extension thereof, and a part arranged between said two plies of material to wipe the surface of the visor element as it is slidably actuated.

4. A visor comprising a panel formed of two plies of material, a visor element slidably disposed between said two plies to be retracted within the panel between said plies or to be drawn out of the panel to serve as an extension thereof, and a cushion element arranged between said two plies adapted to engage a surface of the visor element to frictionally releasably maintain it within the panel and at adjusted positions of withdrawal therefrom.

5. A visor comprising two plies of material secured together at the top and ends but having an opening therebetween at the bottom, a secondary visor element slidably disposed between said two plies of the visor and receivable at a position of substantial concealment therebetween, said secondary visor element adapted to be withdrawn along a straight line directly outwardly from between said two plies to a position extending therebeyond.

6. A visor panel comprising two plies of material secured together at the top and ends but having an opening therebetween at the bottom, a secondary visor element slidably disposed between said two plies of the visor and receivable at a position of substantial concealment therebetween, said secondary visor element adapted to be drawn directly outwardly from between said two plies to any one of a plurality of positions extending therebeyond and provided with end lugs adapted to prevent complete withdrawal thereof from between said two plies.

7. A visor panel comprising two plies of material secured together at the top and ends but having an opening therebetween at the bottom, a frame between said two plies provided with two end portions turned inwardly along the bottom edges of the panel between said two plies, a second visor element slidably disposed between said two plies of the visor and receivable at a position of substantial concealment therebetween, said secondary visor element adapted to be withdrawn directly outwardly from between said two plies to any one of a plurality of positions extending therebeyond and provided with end lugs adapted to engage the opposed inturned end portions of the frame to prevent complete withdrawal of the secondary visor element from between said two plies.

8. A visor panel comprising, in combination, a cloth covered panel folded upon itself, means inside said folded panel reinforcing the same along the folded edge and the two opposite sides adjacent thereto, a secondary visor element slidably disposed between the folded parts of said panel and withdrawable from the open edge of the folded panel when desired for use.

9. A visor comprising, in combination, a cloth covered panel folded upon itself with the folded parts extending in parallel juxtaposition, a secondary visor element slidably disposed between said parts and withdrawable from the open end of the folded panel when desired for use, and means between said parts of the folded panel adapted to retain a part of said element within the folded parts of the panel so as to prevent complete withdrawal of the element from the open end of the folded panel.

10. A visor comprising, in combination, a panel folded upon itself with half sections thereof extending in parallel juxtaposition, a secondary visor element slidably disposed between said half sections and withdrawable through the open end of the folded panel, and means between said half sections yieldingly engaging opposite sides of said element and acting to frictionally releasably hold the same against withdrawal.

11. A visor panel comprising, in combination, a frame having a longitudinal section and a pair of spaced transverse sections extending from said longitudinal section in the same plane, a cloth covered panel folded about the longitudinal section of said frame and forming a pair of complementary leaves extending in parallel juxtaposition on either side of the transverse sections of said frame, a member adapted to form an extension to said visor slidably received between said leaves of the panel and movable from a position of non-use between said leaves to a position of use beyond the open end of the leaves, and means between said leaves yieldingly bearing upon said member and acting to restrain movement of the same to prevent unintended movement thereof.

12. A visor comprising, in combination, a composition fiber board folded upon itself with the two half sections thereof extending in close parallel relationship, means reinforcing said board extending between said half sections along the folded edge of the board and the two opposite sides thereof adjacent the folded edge, a visor element slidably disposed between the half sections of the folded board within the central expanse of the panel, said element adapted for withdrawal from between said half sections through the open unreinforced edge of the folded board, means adapted for connecting said element to said board to prevent complete withdrawal of the element from between said half sections, and cloth material between said half sections adapted to engage the surface of said element to frictionally hold the same against unintended movement in the folded board.

CHARLES BAYARD JOHNSON.